(12) United States Patent
Nebrigic et al.

(10) Patent No.: US 7,816,891 B2
(45) Date of Patent: Oct. 19, 2010

(54) ACTIVE VOLTAGE MANAGEMENT SYSTEM FOR ENERGY STORAGE DEVICE

(75) Inventors: Dragan Nebrigic, Carlsbad, CA (US); Jeffrey Johnstone, San Diego, CA (US); Vlastislav Haman, San Clemente, CA (US); Hung Q. Ha, Escondido, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 528 days.

(21) Appl. No.: 11/942,682

(22) Filed: Nov. 19, 2007

(65) Prior Publication Data
US 2008/0136376 A1    Jun. 12, 2008

Related U.S. Application Data

(60) Provisional application No. 60/866,408, filed on Nov. 17, 2006.

(51) Int. Cl.
*H02J 7/00*     (2006.01)
*H02J 7/04*     (2006.01)
*G01N 27/416*   (2006.01)
*G08B 21/00*    (2006.01)
*H02M 3/18*     (2006.01)

(52) U.S. Cl. ................. 320/136; 320/165; 324/426; 340/636.1; 340/636.21; 363/59

(58) Field of Classification Search .................. 320/136
See application file for complete search history.

(56) References Cited

U.S. PATENT DOCUMENTS

| | | | | |
|---|---|---|---|---|
| 4,855,922 | A  * | 8/1989 | Huddleston et al. | 700/295 |
| 6,507,169 | B1 * | 1/2003 | Holtom et al. | 320/106 |
| 6,538,414 | B1 | 3/2003 | Tsuruga et al. | |
| 2005/0024061 | A1 * | 2/2005 | Cox et al. | 324/426 |

FOREIGN PATENT DOCUMENTS

| | | |
|---|---|---|
| KR | 10-2001-0101391 A | 11/2001 |
| KR | 10-2006-0060830 A | 6/2006 |

OTHER PUBLICATIONS

Korean Intellectual Property Office acting as International Searching Authority, "International Search Report" (Form PCT/ISA/210) for International Application No. PCT/US2007/085143, Mar. 20, 2008, 5 pages.
Korean Intellectual Property Office acting as International Searching Authority, "Written Opinion of the International Searching Authority" (Form PCT/ISA/237) for International Application No. PCT/US2007/0851423, Mar. 20, 2008, 6 pages.

* cited by examiner

*Primary Examiner*—Patrick J Assouad
*Assistant Examiner*—Yalkew Fantu
(74) *Attorney, Agent, or Firm*—Oppedahl Patent Law Firm LLC (57) ABSTRACT

An active voltage management device and a method for actively managing a voltage level of an energy storage device are provided. The active voltage management device comprises: a pair of input terminals adapted to be connected to the energy storage device; a reverse polarity protection circuit coupled to the pair of input terminals; a voltage comparator circuit adapted to compare a second voltage associated with the voltage level of the energy storage device to a reference voltage and to provide an output based upon the comparison of the second voltage to the reference voltage; and a transistor adapted to operate in a linear mode to dissipate energy from the energy storage device at a substantially constant current level, wherein output of the voltage comparator circuit is adapted to activate the transistor when the second voltage is greater than or equal to the reference voltage. The method comprises: receiving an input voltage from the energy storage device; providing reverse polarity protection from the energy storage device; comparing the a second voltage associated with the input voltage from the energy storage device to a reference voltage; and conducting a transistor in a linear mode to dissipate energy from the energy storage device at a substantially constant current level when the second voltage is greater than or equal to the reference voltage.

28 Claims, 9 Drawing Sheets

FIG.4B-2

ACTIVE VOLTAGE MANAGEMENT SYSTEM FOR ENERGY STORAGE DEVICE

CROSS-REFERENCE TO RELATED APPLICATIONS

This application claims the benefit of U.S. provisional application No. 60/866,408, filed 17 Nov. 2006, which is hereby incorporated by reference as though fully set forth herein.

BACKGROUND a. Field of the Invention

The instant invention relates to a voltage management system for one or more energy storage cells.

b. Background

Energy storage devices are used to power many electrical devices. The energy storage devices may include one or more energy storage cells connected in series and/or parallel to provide an output voltage. The energy storage device can be charged to store energy in the energy storage device and can be discharged to provide that energy to a load.

When the energy storage device is being charged one or more energy storage cells of the energy storage device may become overcharged. In order to prevent a potentially dangerous or harmful condition, the charging current is and energy stored in the one or more overcharged energy storage cells is dissipated from the cells until the voltage of the cell reaches a predetermined maximum voltage level.

Similarly, when the energy storage device is being discharged, one or more of the energy storage cells of the energy storage device may reach a minimum desired charge level. In double layer capacitors and certain types of rechargeable batteries, for example, a predetermined minimum charge level may be desired to be maintained in each energy storage cell of the energy storage device. When this minimum charge level is reached, the discharge of the energy storage device may be stopped and/or a charging current may be applied to the energy storage device to recharge the one or more energy storage cells.

BRIEF SUMMARY

In one embodiment, an active voltage management device for actively managing a voltage level of an energy storage device is provided. The active voltage management device comprises: a pair of input terminals adapted to be connected to the energy storage device; a reverse polarity protection circuit coupled to the pair of input terminals; a voltage comparator circuit adapted to compare a second voltage associated with the voltage level of the energy storage device to a reference voltage and to provide an output based upon the comparison of the second voltage to the reference voltage; and a transistor adapted to operate in a linear mode to dissipate energy from the energy storage device at a substantially constant current level, wherein output of the voltage comparator circuit is adapted to activate the transistor when the second voltage is greater than or equal to the reference voltage.

In another embodiment, a method of actively managing a voltage level of an energy storage device is also provided. The method comprises: receiving an input voltage from the energy storage device; providing reverse polarity protection from the energy storage device; comparing the a second voltage associated with the input voltage from the energy storage device to a reference voltage; and conducting a transistor in a linear mode to dissipate energy from the energy storage device at a substantially constant current level when the second voltage is greater than or equal to the reference voltage.

The foregoing and other aspects, features, details, utilities, and advantages of the present invention will be apparent from reading the following description and claims, and from reviewing the accompanying drawings.

BRIEF DESCRIPTION OF THE DRAWINGS

Embodiments of the disclosed method and apparatus will be more readily understood by reference to the following figures, in which like reference numbers and designations indicate like elements.

DETAILED DESCRIPTION

A system and method for actively managing one or more individual energy storage elements is provided. In one embodiment, for example, a voltage management system may actively manage a voltage level of an energy storage element by dissipating energy from the energy storage element when a voltage level of energy storage element is greater than and/or equal to a predetermined voltage level. The energy storage element may include one or more individual energy storage cells. The individual energy storage cells may include any type of rechargeable energy storage cell, such as a capacitor, a double layer capacitor, a rechargeable battery cell, and/or a hybrid cell.

Figure 1A:
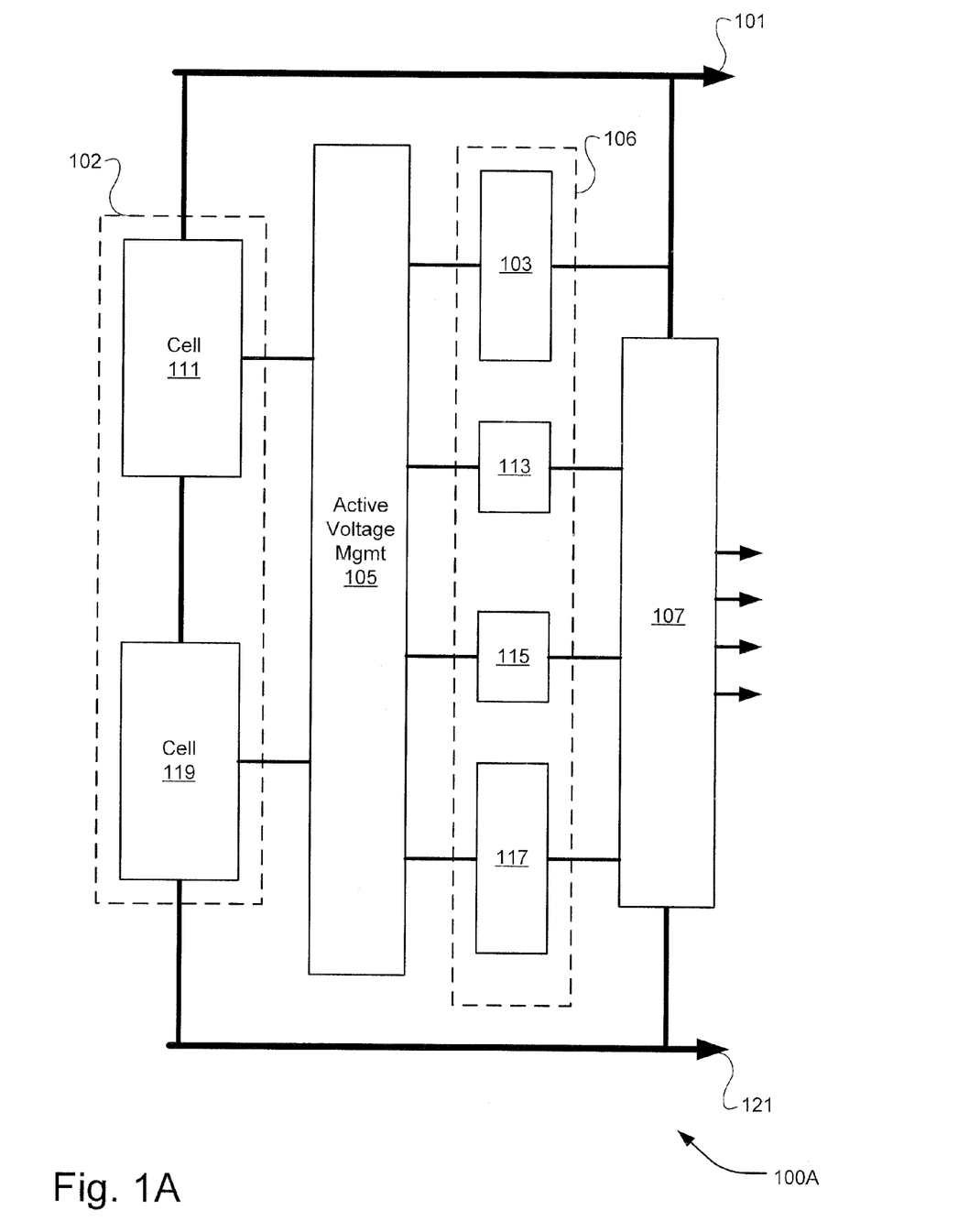
FIG. 1A illustrates a block diagram of one embodiment of a system for balancing an electrical output of two individual energy storage cell elements.

FIG. 1A shows an embodiment of a system 100A for managing an energy storage unit 102, an active voltage management module element 105, and a plurality of energy monitoring elements 106. The energy storage unit 102 comprises a plurality of individual storage cells 111 and 119. In one embodiment, the plurality of individual energy storage cells 111 and 119 comprise capacitors, although the energy storage cells 111 and 119 may comprise secondary batteries (e.g., lithium ion batteries, nickel cadmium batteries, lead-acid batteries), hybrid cells, or other types of energy storage devices. In this embodiment, the energy storage unit 102 provides an electrical payload output to a first terminal 101 and a second terminal 121. The energy storage unit 102 comprises a maximum operating voltage, a nominal operating voltage, an actual operating voltage, and individual energy storage cell outputs for each of the plurality of energy storage cell elements 111 and 119 of the energy storage unit 102.

The energy storage unit 102 is operatively coupled to the at least one active voltage management module element 105 and, therefore, the plurality of individual storage cells 111 and 119 are operatively coupled to the active voltage management module element 105. As will be described in greater detail below, the active voltage management module element 105 is adapted to dissipate energy from at least one of the individual storage cells 111 and 119 when a voltage level of the storage cell is greater than and/or equal to a predetermined threshold.

The plurality of energy monitoring elements 106 is operatively coupled to the active voltage management module element 105. As will be described in greater detail below, the plurality of energy monitoring elements 106 are adapted to monitor various aspects related to the electrical output or operating conditions of the plurality of energy storage elements 111 and 119, and/or detect a change in the electrical output or operating conditions being monitored. In one embodiment, the plurality of energy monitoring elements 106 comprises four monitoring units 103, 113, 115, and 117. The plurality of energy monitoring elements 106 measures various electrical and/or physical parameters of the system 100A. In one embodiment a life data summing stage 107 is operatively coupled to the plurality of energy monitoring elements 106. The life data summing stage 107 may, for example, generate control signals and/or perform calculations based upon inputs received from the monitoring elements 106.

Figure 1B:
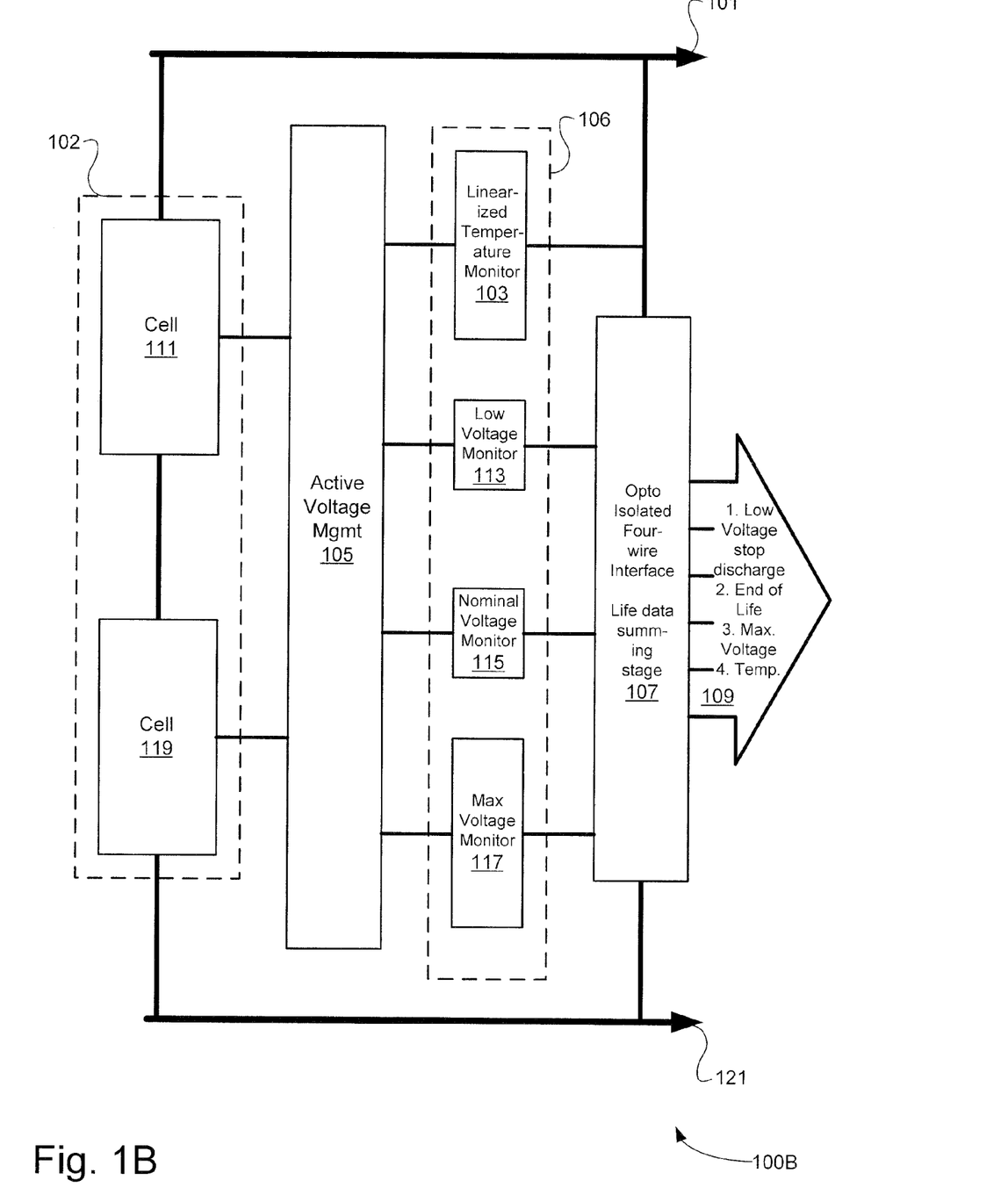
FIG. 1B illustrates a block diagram of another embodiment of a system for balancing an electrical output of two individual energy storage cell elements.

FIG. 1B shows one embodiment of a system 100B for managing an energy storage unit 102 comprising a plurality of individual energy storage cells 111 and 119. In this embodiment, a plurality of energy monitoring elements 106 comprises a linearized temperature monitor element 103, a voltage discharge monitoring element 113, a nominal voltage monitoring element 115, and a maximum voltage monitoring element 117. The linearized temperature monitor element 103 measures a temperature of the voltage management module element 105, an individual energy storage cell, and/or the energy storage unit 102. The nominal voltage monitoring element 115 measures a nominal voltage output of energy storage unit 102. In one embodiment, the nominal voltage output of each cell in the energy storage unit 102 is about 2.7 volts. Although specific monitoring elements are discussed, other types of monitoring elements may be used either instead of or in addition to the ones discussed above. As shown in FIG. 1B, the system 100B may be isolated (e.g., optically isolated) from a control system to protect the control system.

Figure 2:
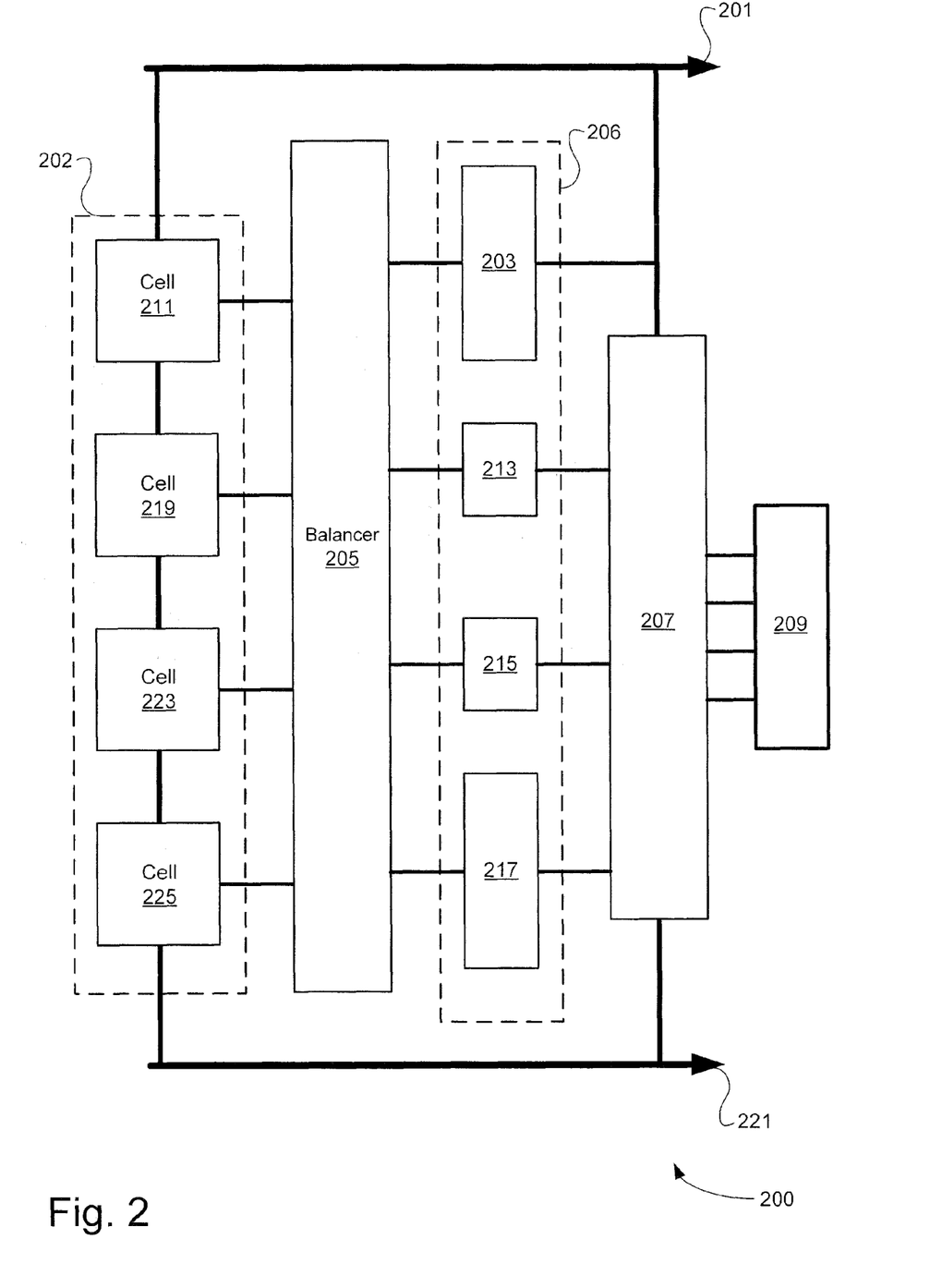
FIG. 2 illustrates a block diagram of one embodiment of a system for balancing an electrical output of four individual energy storage cell elements.

FIG. 2 shows one embodiment of a system 200 for managing an energy storage unit 202. The energy storage unit 202 comprises a plurality of individual energy storage cells 211, 219, 223, and 225. In this embodiment, a voltage management module element 205 is adapted to dissipate energy from at least one of the individual storage cells 211, 219, 223, and 225 when a voltage level of the storage element is greater than or equal to a predetermined threshold. The system 200 further comprises a plurality of energy monitoring elements 206, which measure and/or monitor an output of the voltage management module element 205, an output of the energy storage unit 202, and/or one or more operating conditions of the voltage management module element 205 and the energy storage unit 202. A life data summing stage 207 is operatively coupled to the plurality of energy monitoring elements 206. The life data summing stage 207 may, for example, generate control signals and/or perform calculations based upon conditions being monitored by one or more of the monitoring elements 206.

In one embodiment, the plurality of energy monitoring elements 206 comprises four monitoring units 203, 213, 215, and 217. The plurality of energy monitoring elements 206 measures various electrical conditions and/or physical parameters of the system 200, such as voltage, current, and/or temperature. The plurality of energy monitoring elements 206 provide information to the system 200 regarding outputs of the plurality of individual energy storage cells 211, 219, 223, and 225. The system 200 may generate control signals and/or perform calculations based upon the conditions being monitored by the plurality of energy monitoring elements 206, such as via the life data summing stage 207. In one embodiment, the plurality of energy monitoring elements 206 detect a change in output voltage of the individual energy storage cells 211, 219, 223, and 225. The system 200 is also adapted to dissipate energy from at least one of the individual storage cells 211, 219, 223, and 225 via the voltage management module element 205 when a voltage level of the storage cell is greater than or equal to a predetermined threshold.

Figure 3A:
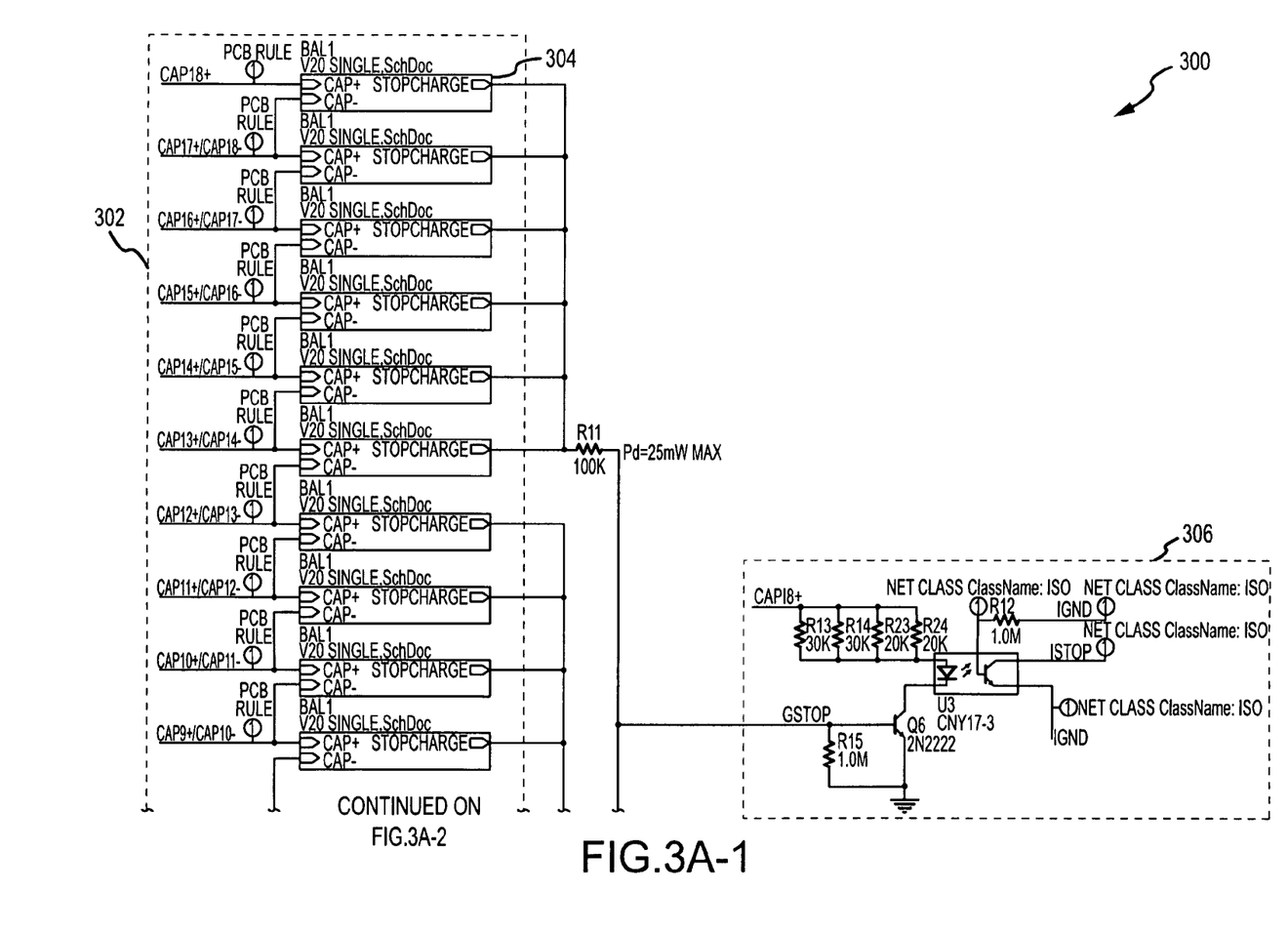
FIG. 3A, labeled as sub-parts 3A-1 and 3A-2, illustrates a block diagram of a top-level view of a single cell balancing system.
FIG. 3B illustrates a block diagram of a low-level view of a single cell balancing system.
Figure 3A:
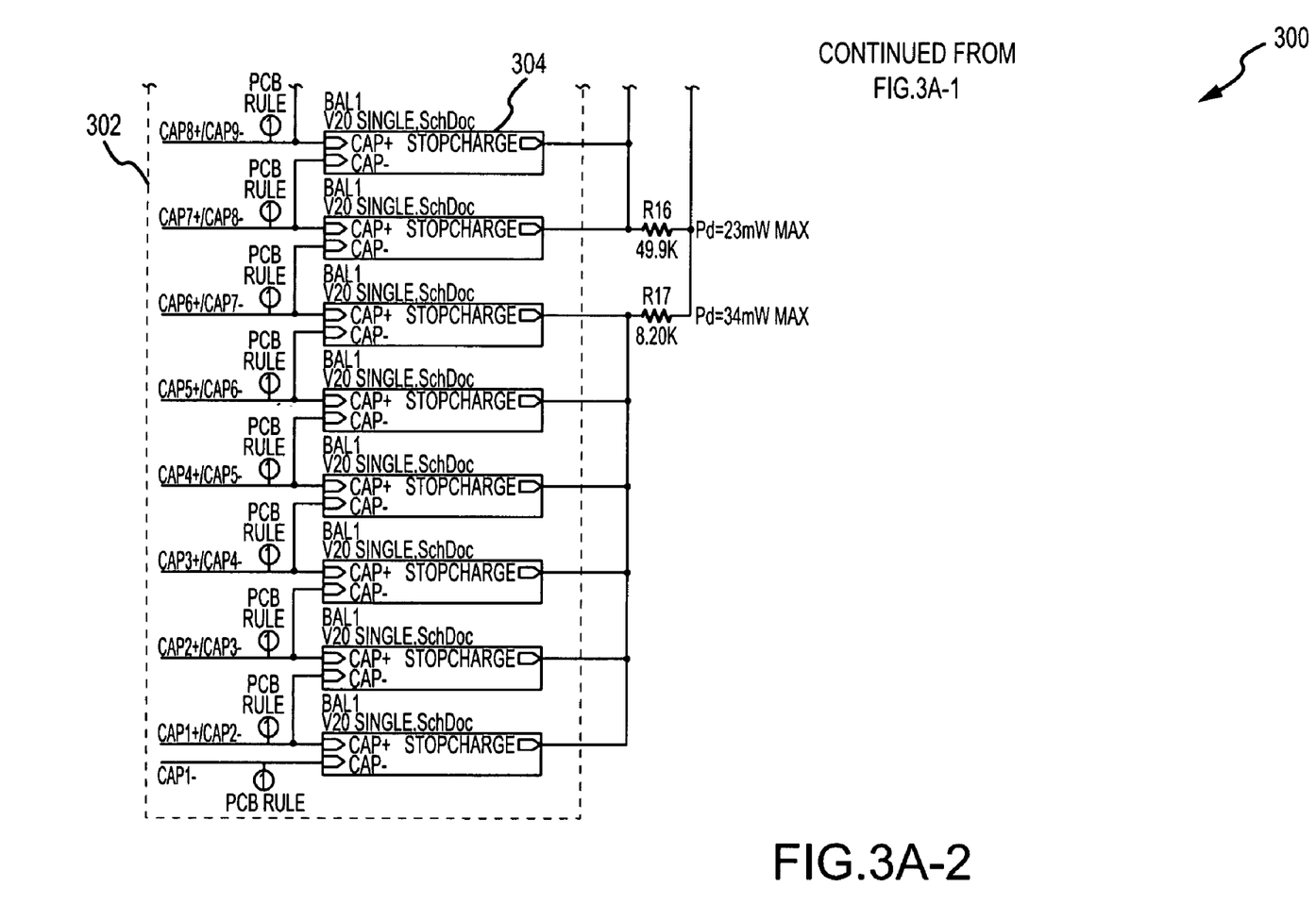

FIG. 3A shows a top-level schematic diagram of an energy storage system 300. The energy storage system 300 comprises an energy storage unit device 302, a plurality of voltage management devices 304, and a stop charge control block 306 that is a component of a life data summing element. The energy storage unit device 302 comprises a plurality of individual energy storage cells connected in series. Each of the individual energy storage cells is coupled to an individual voltage management device 304. Each of the individual voltage management devices 304 is adapted to dissipate energy from the individual energy storage cell coupled to it when the voltage level of the cell is greater than or equal to a predetermined voltage. The voltage management devices 304, for example, reduce the voltage of the individual cells when those cells have a voltage level greater than desired.

Figure 3B:
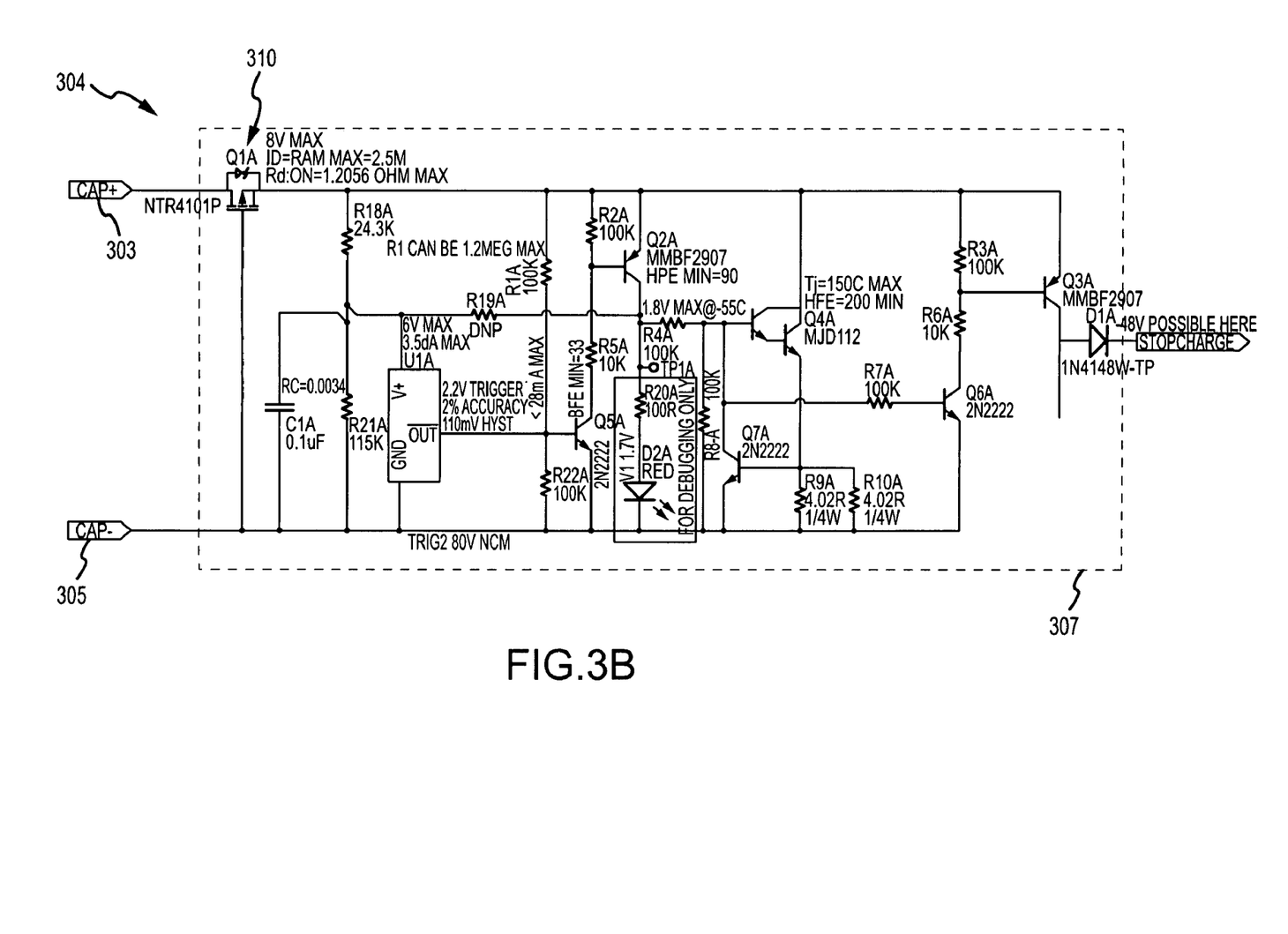

The voltage management devices 304 may also generate a signal (e.g., a STOP_CHARGE signal) to be provided to a control system indicating that an overcharge condition has been reached in an energy storage cell. The signal is provided to the stop charge control block 306. When the signal is asserted by the voltage management device 304, a transistor Q8 of the stop charge control block 306 is turned on to conduct current through an LED U2 of an optical isolator. The output of the optical isolator, in turn, provides an isolated control signal to a system controller, such as via an open collector output configuration of the isolator. In the embodiment of FIG. 3B, the stop charge control block 306 provides a control signal if any one of the voltage management devices 304 detects an overcharge condition on an energy storage cell. In other embodiments, the stop charge control block 306 may provide a stop charge control signal to a system controller if each of the voltage management devices 304 or a subset of the voltage management devices 304 detects an overcharge condition on their associated energy storage cells.

FIG. 3B shows a schematic diagram of a single cell voltage management circuit 304. The single cell voltage management circuit 304 is coupled to a single energy storage cell (e.g., a capacitor, secondary battery, or hybrid cell) of the energy storage unit device 302 as shown in FIG. 3A. The energy storage cell is coupled to the voltage management circuit 304 via a first electrical contact point 303 and a second electrical contact point 305. The voltage management circuit 304 monitors an output voltage of the energy storage cell. In one embodiment, the voltage management circuit compares the output voltage to a reference voltage value. If the output voltage is greater than the reference voltage value, the voltage management circuit dissipates energy from the energy storage cell to reduce the voltage of the cell to a level less than or equal to the reference value.

As shown in FIG. 3B, a reverse polarity protection circuit 310 is connected to the first electrical contact point 303 and the second electrical contact point 305. The reverse polarity protection circuit 310 protects the voltage management circuit 304 if the energy storage cell is connected in the wrong orientation or if the voltage of the cell goes negative during discharge. In the particular embodiment shown in FIG. 3B, the reverse polarity protection circuit comprises a p-channel MOSFET Q1A. A drain of the MOSFET Q1A is connected to the first electrical contact point 303, and a gate of the MOSFET Q1A is connected to the second electrical contact point 305. If the voltage level at the gate (i.e., at the second electrical contact point 305) is greater than the voltage level at the drain (i.e., at the first electrical contact point 301), the MOSFET Q1A prevents current from flowing from the energy storage device. If the voltage level at the drain is greater than the voltage level at the gate, the MOSFET Q1A allows current to flow from the energy storage device to the voltage management circuit 304. The low on-resistance of the MOSFET Q1A provides a very low loss reverse polarity protection circuit 310. Although one embodiment of a reverse polarity protection circuit is shown in FIG. 3B, one skilled in the art would recognize from this disclosure that other embodiments could also be used.

In the embodiment shown in FIG. 3B, the voltage management circuit 304 also comprises a resistor voltage divider including resistors R18A and R21A, a filter capacitor C1A, and a voltage comparator U1A. The resistor voltage divider including resistors R18A and R21A provides a fraction of the voltage level provided to the circuit 304 as an input voltage to the voltage comparator U1A. The filter capacitor C1A forms a low pass filter with resistor R18A that prevents oscillations and suppresses transients.

The voltage comparator U1A comprises an integrated reference voltage comparator. The comparator U1A is configured in an open drain output configuration that pulls an inverted output OUT low until a voltage threshold is reached at the input to the comparator. When the input voltage reaches the voltage threshold, however, the comparator U1A sinks current at the inverted output OUT. The voltage comparator receives an input voltage from the resistor voltage divider and compares that input voltage to the threshold voltage level of the comparator. The inverted output OUT provides an output based on the comparison of the input voltage to the threshold voltage of the comparator. In the embodiment shown in FIG. 3B, for example, the threshold voltage comprises about a 2.2 volt trigger corresponding to an energy cell voltage of about 2.8 volts. The inverted output OUT of the voltage comparator U1A is low when the input voltage provided by the voltage divider is less than the threshold voltage of the comparator. The inverted output OUT of the voltage comparator sinks current from the transistor Q5A to turn the transistor Q5A on when the input voltage is greater than or equal to the threshold voltage of the comparator. The transistor Q5A in turn turns on the transistor Q2A which also in turn turns on the transistor Q4A.

In the embodiment shown in FIG. 3B, the voltage comparator U1A also provides a hysteresis window that prevents the voltage management circuit 304 from oscillating. In one embodiment in which a resistor R19A is not included in the circuit, the hysteresis of the voltage comparator U1A can be preset at a predetermined level (e.g., 110 mV). By adding the resistor R19A, the hysteresis window can be increased by a voltage level depending on the value of the resistor 19A added to the circuit 304.

In one embodiment, the transistor Q4A operates in a constant current linear mode to dissipate energy from the energy storage cell coupled to the voltage management circuit 304 at a constant rate of discharge. By using the transistor in a constant current linear mode to dissipate energy instead of primarily relying on a resistor to dissipate the majority of the energy from the energy storage cell, the discharge of current can be held constant regardless of the voltage level of the energy storage cell and further allows the resistors of the circuit 304 to be sized smaller than if the resistors were used as the primary discharge mechanism. A transistor Q7A can also be used to provide an overcurrent protection for the transistor Q4A.

In one embodiment, for example, the transistor Q4A may draw approximately 300 mA. In this embodiment, the transistor Q4A may dissipate at least the majority of the energy dissipated from the energy storage cell. The resistors R9A and R10A also dissipate energy from the energy storage cell, but in one embodiment dissipate less than half of the total energy dissipated from the energy storage cell.

The voltage management circuit 304 shown in FIG. 3B also provides an indicator, such as a light emitting diode (LED) D2A, to indicate when the voltage management circuit is actively dissipating energy from the energy storage cell (or when the voltage management circuit is not actively dissipating energy from the energy storage cell). In the embodiment shown in FIG. 3B, for example, the LED is activated by transistor Q2A described above.

The voltage management circuit 304 also comprises a control signal STOPCHARGE via transistors Q6A and Q3A to indicate when the circuit 304 is actively dissipating energy from an energy storage cell. The control signal, for example, may be used to control a charging current being applied to the energy storage cell connected to the voltage management circuit 304.

In one embodiment, the voltage management circuit 304 draws a low quiescent current when the circuit is not actively dissipating energy from an energy storage cell. The voltage management circuit 304, for example, may draw a quiescent current of approximately 50 μA. Where the dissipation current is approximately 300 mA, for example, a ratio of the dissipation current to the quiescent current is approximately 6000. In other embodiments, for example, the ratio of the dissipation current to the quiescent current is greater than approximately 1000, greater than approximately 2000, greater than approximately 4000, greater than approximately 5000, or greater than approximately 6000.

Figure 4A:
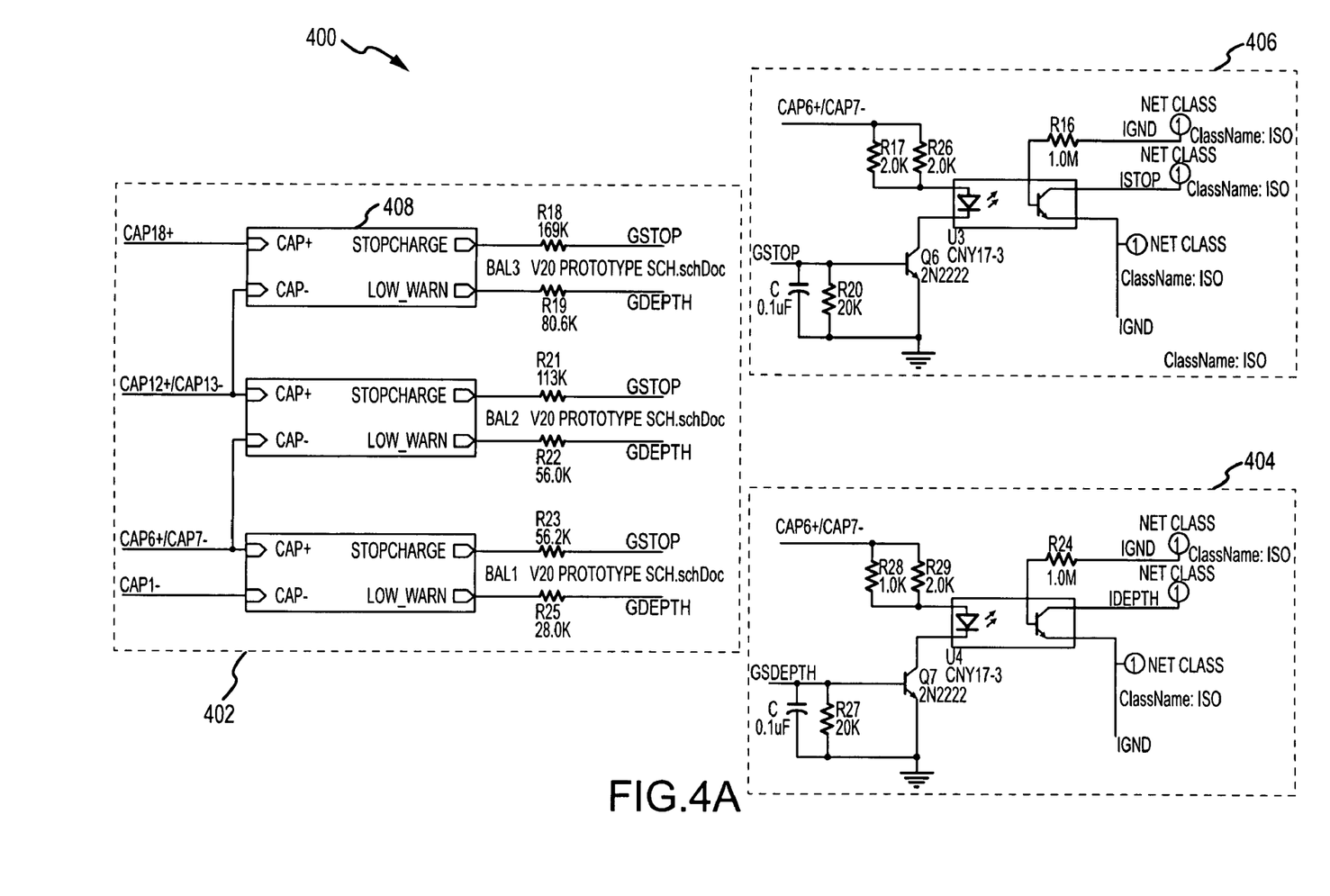
FIG. 4A illustrates a block diagram of a top-level view of a multiple cell balancing system.
Figure 4B:
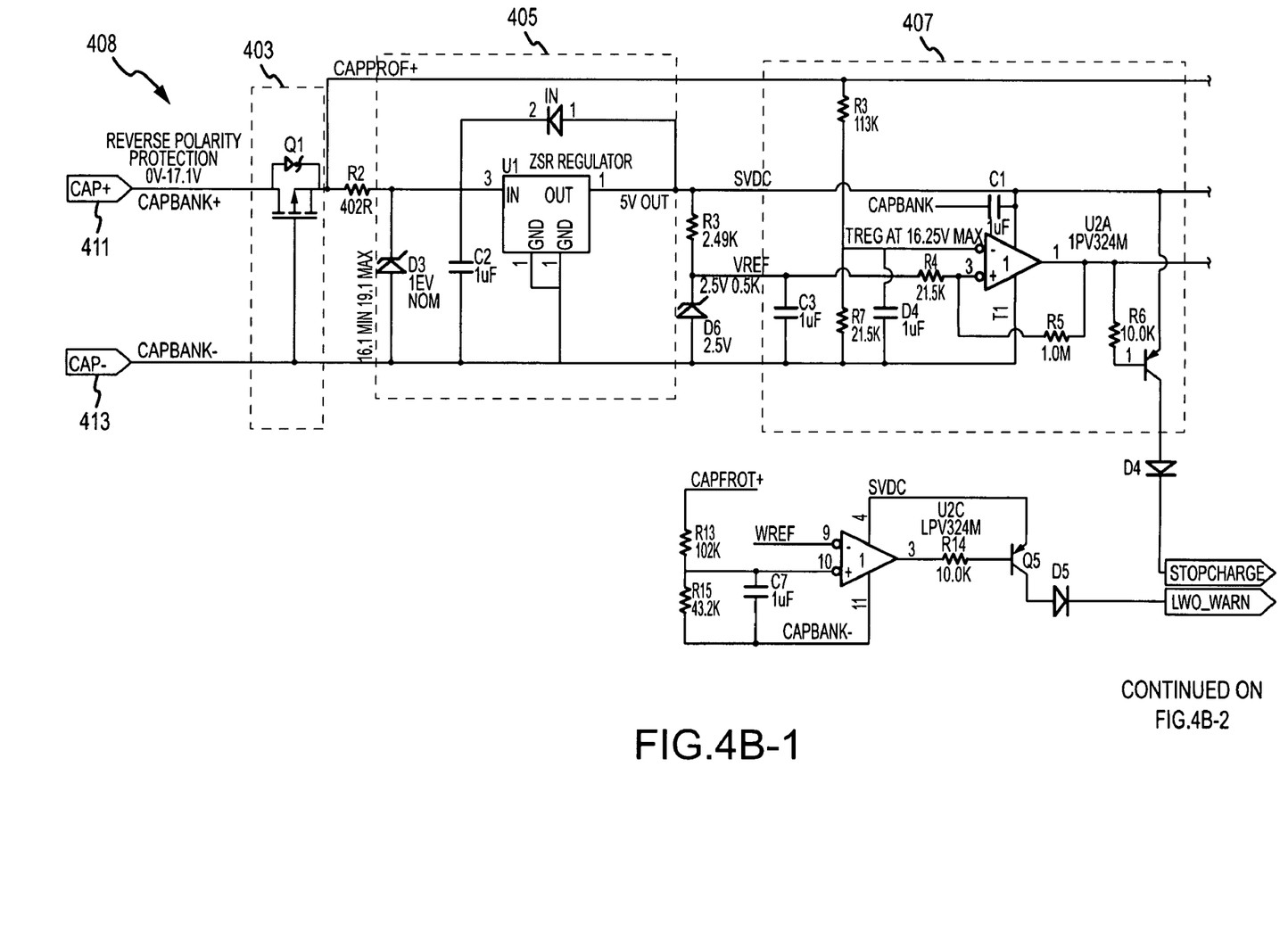
FIG. 4B, labeled as sub-parts 4B-1 and 4B-2, illustrates a block diagram of a low-level view of a multiple cell balancing system.
Figure 4B:
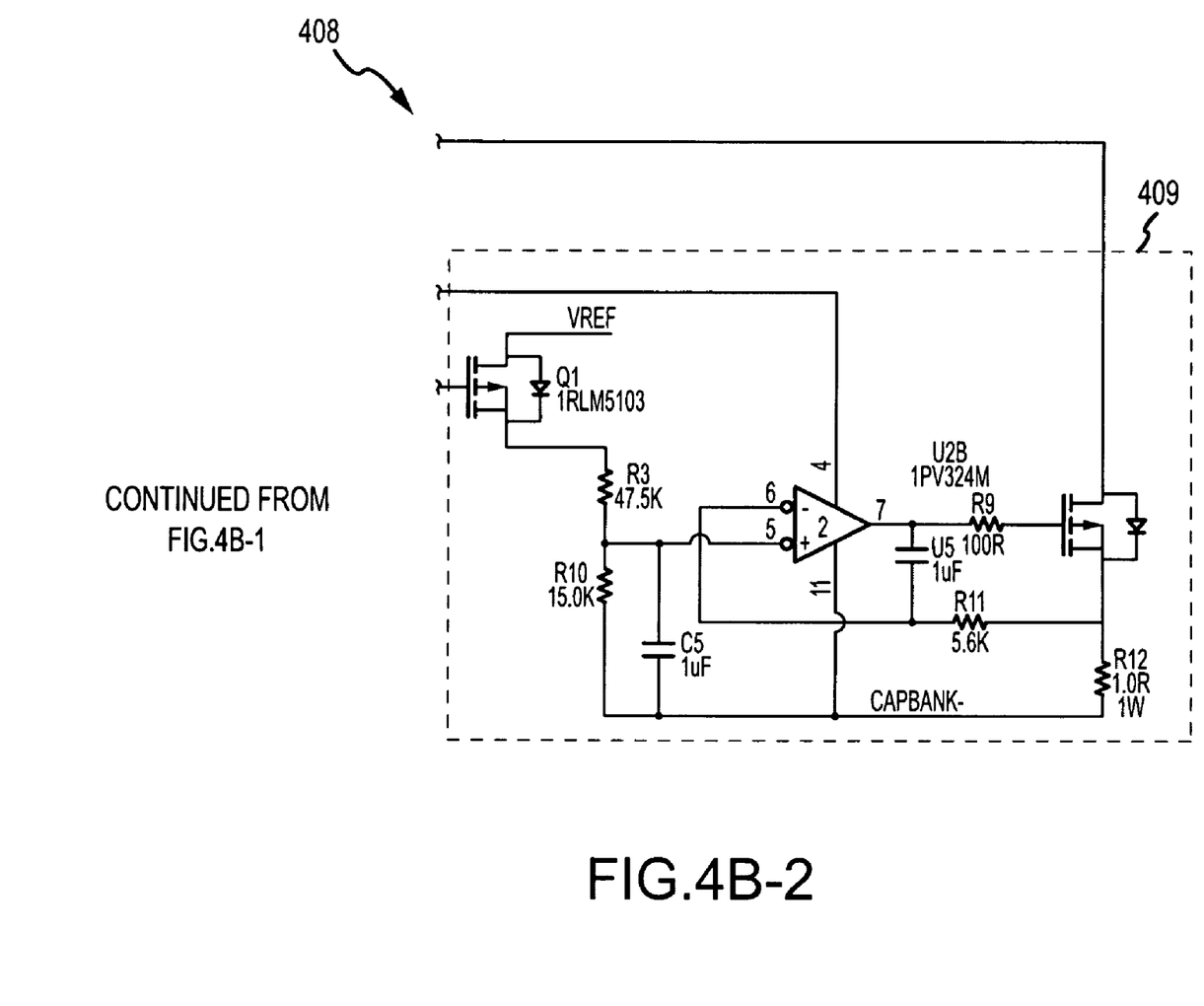

FIG. 4A shows a top-level schematic diagram of a multi-cell voltage management system 400. The multi-cell voltage management system 400 comprises a plurality of multi-cell voltage management circuits 408 that are each coupled to a plurality of energy storage cells of an energy storage unit 402. In one embodiment, for example, the energy storage unit is a module that comprises eighteen energy storage cells connected in series. In this embodiment, the multi-cell voltage management system 400 comprises three voltage management circuits 408 each coupled to six of the series-connected energy storage cells.

Each of the multi-cell voltage management circuits 408 each monitor the voltage of the plurality of energy storage cells coupled to the circuit 408. If the monitored voltage of the plurality of energy storage cells is greater than or equal to a predetermined threshold voltage, the multi-cell voltage management circuit dissipates energy from the plurality of energy storage cells. In the embodiment shown in FIG. 4A, the individual multi-cell voltage management circuits 408 may also provide control signals. These control signals may, for example, be used to stop a charging current from being applied to the plurality of energy storage cells, initiate a charging current to be applied to the plurality of energy storage cells, provide a warning or indicator or an over-voltage condition, or provide another type of warning or ameliorative action.

Low voltage control block 404 and stop charge block 406 operate similarly to stop charge control block 306 described above with reference to FIG. 3A to provide isolated control signals to a system controller for a low voltage control signal and a stop charge control signal, respectively. The low voltage control signal, for example, may be used to disconnect one or more energy storage cell from a load and/or to initiate a charge operation to recharge one or more energy storage cell. Low voltage control block 404 and stop charge control block 406 each comprise a resistor-capacitor (RC) filter on the input of the transistor Q6. The RC filter reduces noise on the control line entering the control block.

FIG. 4B shows an individual voltage management circuit 408 of the voltage management system 400 shown in FIG. 4A. The individual voltage management circuit 408 comprises a reverse polarity protection circuit 403, a voltage regulator circuit 405, a first comparator circuit 406, a second comparator circuit 407, and an energy dissipation circuit 409. The voltage management circuit 401 further comprises a first electrical contact point 411 and a second electrical contact point 413. A plurality of energy storage cells (e.g., a series and/or parallel string of energy storage cells) may be connected between the first electrical contact point 411 and the second electrical contact point 413. The voltage management circuit 408 may be external to a module including the energy storage cells or may be integrated within the module.

The reverse polarity protection circuit 403 is the same as the reverse polarity protection circuit 310 described above with respect to FIG. 3B.

The voltage regulator and reference circuit 405 comprises a voltage regulator and a voltage reference. The voltage regulator comprises a zener diode D2, a voltage regulator U1, a filter capacitor C2, and a voltage clamp diode D1. The zener diode D2 protects the voltage regulator U1 from an input voltage that is too high for the voltage regulator U1. In one embodiment, for example, the zener diode has a breakdown voltage of about 18 volts. The voltage regulator steps down the input voltage from the bank of energy storage cells and provides a fixed output voltage (e.g., about five volts). The zener diode D3 sets the reference voltage (e.g., about 2.5 volts).

The voltage reference comprises a resistor R3 and a reference zener diode D3. The voltage reference provides a reference voltage VREF from the output voltage of the voltage regulator U1 and provides the reference voltage VREF to the first and second comparator circuits 407 and 408.

The first comparator circuit 406 comprises a voltage divider and an op-amp. In the embodiment shown in FIG. 4B, for example, the voltage divider comprises a resistor voltage divider including resistors R1 and R7. The op-amp U2A compares a voltage provided by the voltage divider and the reference voltage VREF. If the voltage provided by the voltage divider is greater than or equal to the reference voltage VREF, the output of the op-amp U2A turns on transistors Q2 and Q3. In the particular embodiment shown in FIG. 4B, the op-amp output is driven low to turn on p-type transistors Q2 and Q3 although other embodiments are also possible. The transistor Q3 (e.g., a p-channel bipolar transistor in the embodiment shown in FIG. 4B) provides a control signal STOPCHARGE that may be used to turn off a charging current from being applied to the bank of energy storage cells coupled to the voltage management circuit 408. The transistor Q2 (e.g., a p-channel MOSFET in the embodiment shown in FIG. 4B) is part of a buffer circuit formed by the transistor Q2 and the op-amp U2B that in turn turns on dissipation transistor Q4 that provides constant current dissipation of energy from the bank of energy storage cells coupled to the individual voltage management circuit 408 via contact points 411 and 413.

The second comparator circuit 407 also comprises a voltage divider and a comparator. The voltage divider in this embodiment is a resistor voltage divider including resistors R13 and R15. The comparator comprises an op-amp U2C that compares a voltage provided by the voltage divider to the reference voltage VREF described above. When the voltage provided by the voltage divider is less than or equal to the reference voltage VREF, the comparator turns on transistor Q5 to provide a low voltage warning signal LOW_WARN. The low voltage warning signal LOW_WARN may be used, for example, to disconnect the energy storage cells from a load and/or to initiate a charging current to re-charge the energy storage cells. In one embodiment, for example, the low voltage warning signal LOW_WARN may be used to indicate that the energy storage cells are at approximately fifty percent of their rated energy storage capacity, although other embodiments may be used depending on the type of energy storage cells being used.

Although embodiments have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. An active voltage management device for actively managing a voltage level of an energy storage device, the active voltage management device comprising:
   a pair of input terminals adapted to be connected to the energy storage device;
   a reverse polarity protection circuit coupled to the pair of input terminals;
   a voltage comparator circuit adapted to compare a second voltage associated with the voltage level of the energy storage device to a reference voltage and to provide an output based upon the comparison of the second voltage to the reference voltage;
   a transistor adapted to operate in a linear mode to dissipate energy from the energy storage device at a substantially constant current level,
   wherein output of the voltage comparator circuit is adapted to activate the transistor when the second voltage is greater than or equal to the reference voltage.

2. The active voltage management device according to claim 1 wherein the reverse polarity protection circuit comprises a MOSFET coupled to the pair of input terminals.

3. The active voltage management device according to claim 1 wherein the voltage comparator circuit provides a hysteresis window to prevent oscillation of the active voltage management device.

4. The active voltage management device according to claim 3 wherein the hysteresis window is adjustable via a resistor coupled to the voltage comparator circuit.

5. The active voltage management device according to claim 1 wherein the voltage comparator circuit comprises a voltage divider and the second voltage associated with the voltage level of the energy storage device comprises a fraction of the voltage level of the energy storage device provided by the voltage divider.

6. The active voltage management device according to claim 5 wherein the voltage divider comprises a resistor voltage divider.

7. The active voltage management device according to claim 1 wherein the second voltage associated with the energy storage device comprises the voltage level of the energy storage device.

8. The active voltage management device according to claim 1 further comprising an over-voltage indicator adapted to be activated by the output of the voltage comparator when the second voltage is greater than or equal to the reference value.

9. The active voltage management device according to claim 1 further comprising a light-emitting diode indicator adapted to be activated by the output of the voltage comparator circuit when the second voltage is greater than or equal to the reference voltage.

10. The active voltage management device according to claim 1 further comprising a low voltage indicator adapted to be activated by the output of the voltage comparator when the second voltage is less than or equal to the reference value.

11. The active voltage management device according to claim 1 further comprising a light-emitting diode indicator adapted to be activated by the output of the voltage comparator circuit when the second voltage is less than or equal to the reference voltage.

12. The active voltage management device according to claim 1 further comprising a control signal generating circuit comprising a transistor activated when the second voltage is greater than or equal to the reference voltage.

13. The active voltage management device according to claim 12 wherein the control signal comprises a stop charge control signal.

14. A method of actively managing a voltage level of an energy storage device, the method comprising:
   receiving an input voltage from the energy storage device;
   providing reverse polarity protection from the energy storage device;
   comparing the a second voltage associated with the input voltage from the energy storage device to a reference voltage;
   conducting a transistor in a linear mode to dissipate energy from the energy storage device at a substantially constant current level when the second voltage is greater than or equal to the reference voltage.

15. The method according to claim 14 wherein the operation of providing reverse polarity protection comprises coupling a MOSFET to a pair of input terminals.

16. The method according to claim 14 wherein the operation of comparing comprises employing a hysteresis window to prevent oscillation.

17. The method according to claim 16 wherein the hysteresis window is adjustable.

18. The method according to claim 14 wherein the second voltage comprises a fraction of the input voltage to the reference voltage obtained by applying the input voltage to a voltage divide.

19. The method according to claim 18 wherein the voltage divider comprises a resistor voltage divider.

20. The method according to claim 14 wherein the second voltage associated with the energy storage device comprises the voltage level of the energy storage device.

21. The method according to claim 14 further comprising indicating an over-voltage condition when the second voltage is greater than or equal to the reference value.

22. The method according to claim 14 further comprising indicating an over-voltage condition by activating a light-emitting diode when the second voltage is greater than or equal to the reference voltage.

23. The method according to claim 14 further comprising indicating a low voltage condition when the second voltage is less than or equal to the reference value.

24. The method according to claim 14 further comprising indicating a low voltage condition by activating a light-emitting diode when the second voltage is less than or equal to the reference voltage.

25. The method according to claim 14 further comprising generating a control signal via a transistor activated when the second voltage is greater than or equal to the reference voltage.

26. The method according to claim 25 wherein the control signal comprises a stop charge control signal.

27. The method according to claim 26 wherein the control signal is applied to a stop charge control block, the control block comprising a receiving resistor-capacitor (RC) filter, a transistor, and an optical isolator to provide an isolated control signal to a system controller.

28. An active voltage management device for actively managing a voltage level of an energy storage device, the active voltage management device comprising:
   a pair of input terminals adapted to be connected to the energy storage device;
   a reverse polarity protection circuit coupled to the pair of input terminals;
   a voltage comparator means for comparing a second voltage associated with the voltage level of the energy storage device to a reference voltage and to provide an output based upon the comparison of the second voltage to the reference voltage;
   a transistor adapted to operate in a linear mode to dissipate energy from the energy storage device at a substantially constant current level, wherein output of the voltage comparator means is adapted to activate the transistor when the second voltage is greater than or equal to the reference voltage.

* * * * *